Figure 1:
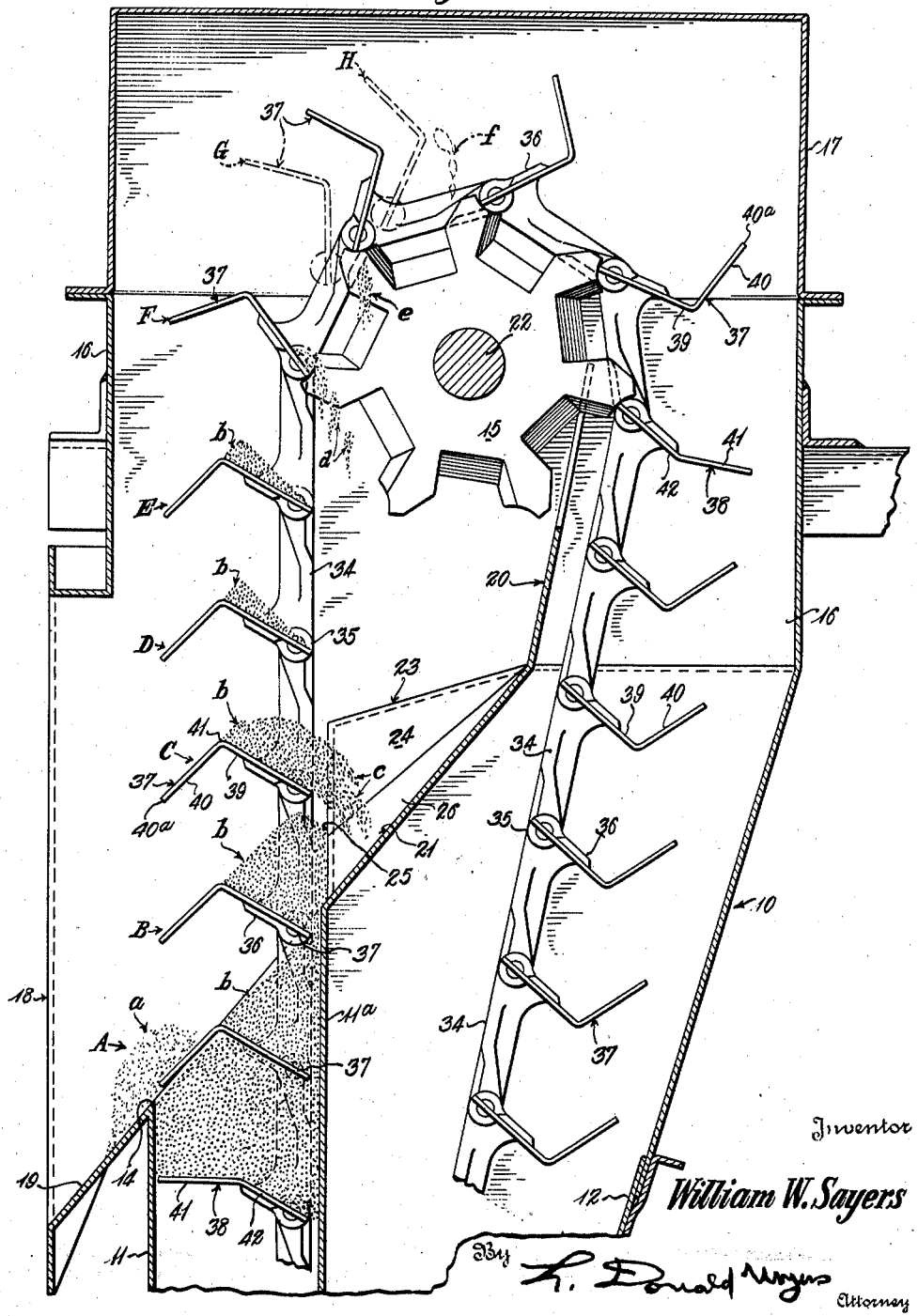

March 25, 1941. W. W. SAYERS 2,235,854
CONVEYER
Filed Jan. 30, 1940 4 Sheets-Sheet 1

Inventor
William W. Sayers
By L. Donald Myers
Attorney

March 25, 1941. W. W. SAYERS 2,235,854
CONVEYER
Filed Jan. 30, 1940 4 Sheets-Sheet 2

Inventor
William W. Sayers

March 25, 1941.    W. W. SAYERS    2,235,854
CONVEYER
Filed Jan. 30, 1940    4 Sheets-Sheet 3
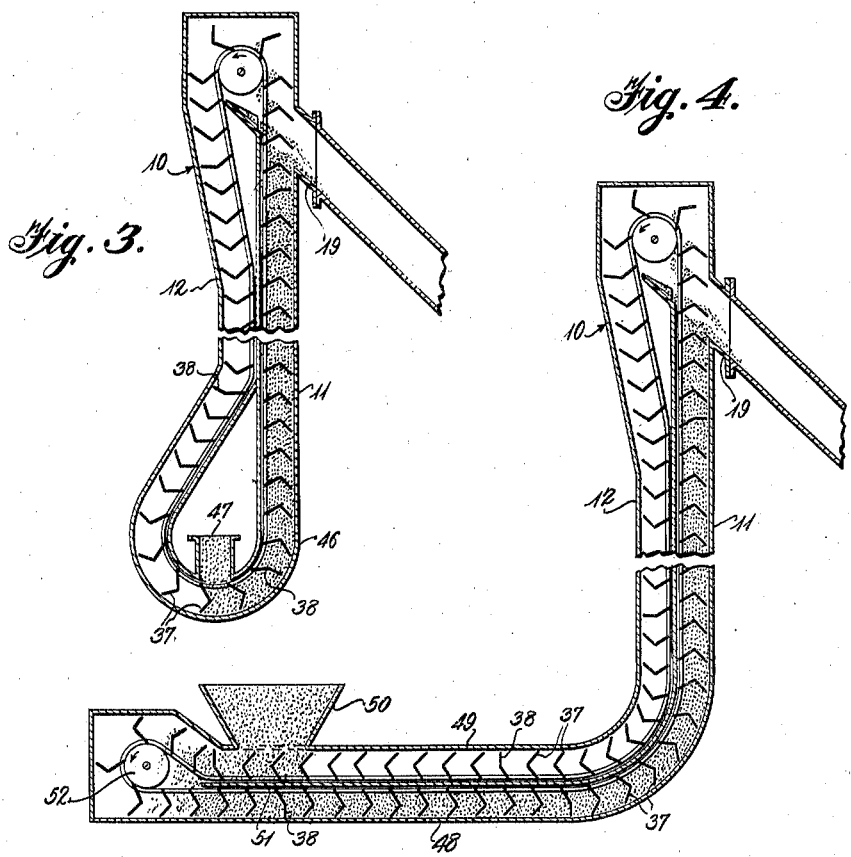
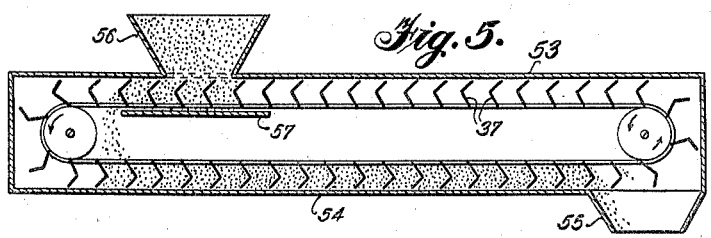
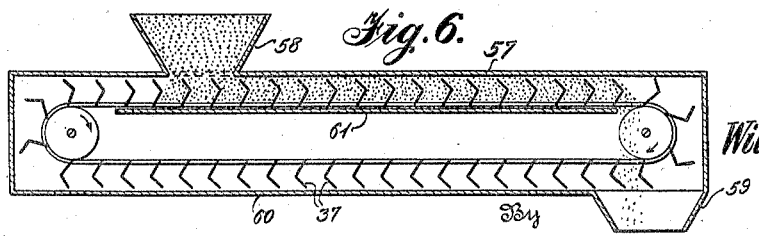
Inventor
William W. Sayers Patented Mar. 25, 1941

2,235,854

UNITED STATES PATENT OFFICE 2,235,854

CONVEYER

William W. Sayers, Chicago, Ill., assignor to Link-Belt Company, a corporation of Illinois Application January 30, 1940, Serial No. 316,434

20 Claims. (Cl. 198—168)

This invention relates to new and useful improvements in solid flight conveyers and/or elevators adapted to transport flowable materials in lump, granular, powdered, or other comminuted form.

Up to recent years, comminuted materials, when transported by chain conveyers, have been moved along horizontal paths and up slightly inclined paths by means of scraper conveyers and have been moved up steeper inclined or truly vertical paths by means of bucket elevators. When the path of movement of the materials included both horizontal and vertical or steeply inclined portions, it was necessary to employ a scraper conveyer for the horizontal portion and a bucket elevator for the vertical or steeply inclined portion. This, naturally, necessitated transferring material from one type of conveyer to the other and, as this transferring in effect constituted an additional handling of the material, resulted in the development of degradation.

During recent years, the development of chain conveyers has reached the point where comminuted materials, in lump, granular, or powdered form, can now be conveyed by means of a single conveyer through horizontal, inclined, or truly vertical paths and any desired combinations of such paths. This movement of flowable materials is obtained either by means of closely spaced open or skeleton flights, or by means of flat solid flights, both of which operate in casings or conduits which are entirely closed, except for the feed and discharge openings, or are closed in the load carrying runs on all sides through which the materials might be lost by gravity.

The closely spaced open or skeleton flight type of conveyer operates on the principle of moving the material en masse in a continuous column with the flights and their connecting chain links, or the like, forming a temporary reinforcement for the column. The flights cause the boundary layer of material to travel with the conveyer while the remainder of the load coalesces with the boundary layer and moves therewith. When a continuous column of material is conveyed up an inclined path, or a truly vertical path, there must be some support for the same at the bottom or foot of the path, and to provide this support the material must be fed at a rate corresponding with the maximum capacity of the conveyer, which, of course, is determined by the size of the flights and their speed of travel. If proper support for the material moving up an inclined or a vertical path is not provided, slippage will occur and the amount of slippage will be substantially the same as the difference between the maximum capacity of the conveyer and the actual rate of feed. The slippage will not correspond identically with the deficiency of feed because a certain amount of slippage always occurs with this type of flight regardless of the rate of feed.

If the feed of material is completely stopped while the movement of the flights is continued, the flights merely pass or pull through the material in the inclined or vertical path of the casing, and no conveying movement of the material takes place. It is obvious, therefore, that inclined or vertical legs of casings cannot be cleaned out or emptied with this type of flight. A makeshift remedy for this clean out difficulty is to bridge the opening in one or more flights by means of a wad of paper, waste, or the like, which will provide the required support for the vertical portion of the column and will carry the material to the discharge opening.

When material is fed to the conveyer casing at a rate which is less than the maximum capacity of the conveyer, movement of the material through the vertical or inclined leg will take place but, of course, the rate of movement can be no greater than the rate of feed. Therefore, the difference between the maximum capacity of the conveyer and the actual rate of feed of the material is compensated for by the movement of the flights and their connecting chain links, through the material being conveyed. This relative movement, or "slip" causes the material in the vertical or inclined casing leg to tumble and roll or otherwise be subjected to considerable agitation with the result that degradation is formed. In fact, this agitation is so definite and pronounced that this type of conveyor is being used in some plants as a means for mixing flowable materials.

The flat solid flight type of conveyer is not subjected to this same difficulty because it operates on the principle of handling the material in batches. That is, each adjacent pair of flights forms a compartment in which the material is moved. The material in each compartment depends for support on the flight which forms the lower wall of its compartment and not on the material in the next adjacent lower compartment or in any other portion of the conveyer casing. This type of conveyer, therefore, may be operated without producing degradation at a less than maximum capacity rate or, for example, at one-half or one-quarter its maximum capacity. The flat solid flights, of course, are able to clean out vertical casing legs without resorting to any unusual procedure other than to continue the operation of the conveyer a reasonable length of time after the feeding of material has stopped.

With flat solid flights, the slip loss, or leakage past the flights, is very slight and can be controlled by regulating the amount of clearance left between the edges of the flights and the walls of the casing.

The maximum capacity of a solid flight type of conveyer is greater than the maximum capacity of an open or skeleton flight type of conveyer when the cross sectional areas of the casings for these two types of conveyers are the same. This is because it is impossible to control the slippage with open or skeleton flights to the same extent as with solid flights and because the compartments, or spaces between adjacent solid flights, may be completely filled with the material when the conveyer is operating at full capacity so that for all practical purposes the material in a solid flight type of conveyer is moved as a continuous column.

In the conveying of material through an inclined or a truly vertical leg of a casing by means of closely positioned open or skeleton flights, as has been explained above, a continuous column of material is provided which is equal in height to the distance between the foot of the casing leg and either the top of the leg or the location of the discharge opening if the material is discharged from said leg. This continuous column of material provides a considerable "head" and causes the material to settle and pack, producing side pressure against the casing walls. Material conveyed by means of flat solid flights will, of course, settle and pack when the flights travel through an inclined or a vertical casing leg. However, this settling and packing is limited to each separate batch of material located in the individual compartments formed by adjacent flights. This relatively slight settling and packing, therefore, cannot produce side pressure which is comparable to that produced with open or skeleton flights.

It will be observed from the above discussion that there are certain real advantages to be obtained by employing flat solid flights instead of open or skeleton flights. However, the flat solid flights now being used are not capable of discharging or spilling their batches of material as quickly and as completely as the open or skeleton flights. This requires the present flat solid flight conveyers to be operated at a sufficiently slow speed to allow for complete discharge or a certain portion of the material will be carried over the head wheel and will be returned down the return run of the casing.

It is the primary object of this invention to provide a solid flight type of conveyer, elevator, or conveyer-elevator employing what will be referred to hereinafter as "peak-top" flights for producing the desired flow or movement of comminuted materials, in lump, granular, or powdered form, through an enclosing casing.

A further important object of the invention is to provide solid peak-top flight conveyers, elevators, or elevator-conveyers which will readily discharge materials from the vertical legs of conveyer casings without carrying material over to the return run or leg of the casing; which will not develop excessive side pressures in handling material which settle and pack; which will permit very little slip or leakage of material past the flight; which will require a minimum amount of horse power to operate; and which will be capable of quickly emptying or cleaning out conveyer or elevator casings after the feeding of material has stopped.

Figure 2:
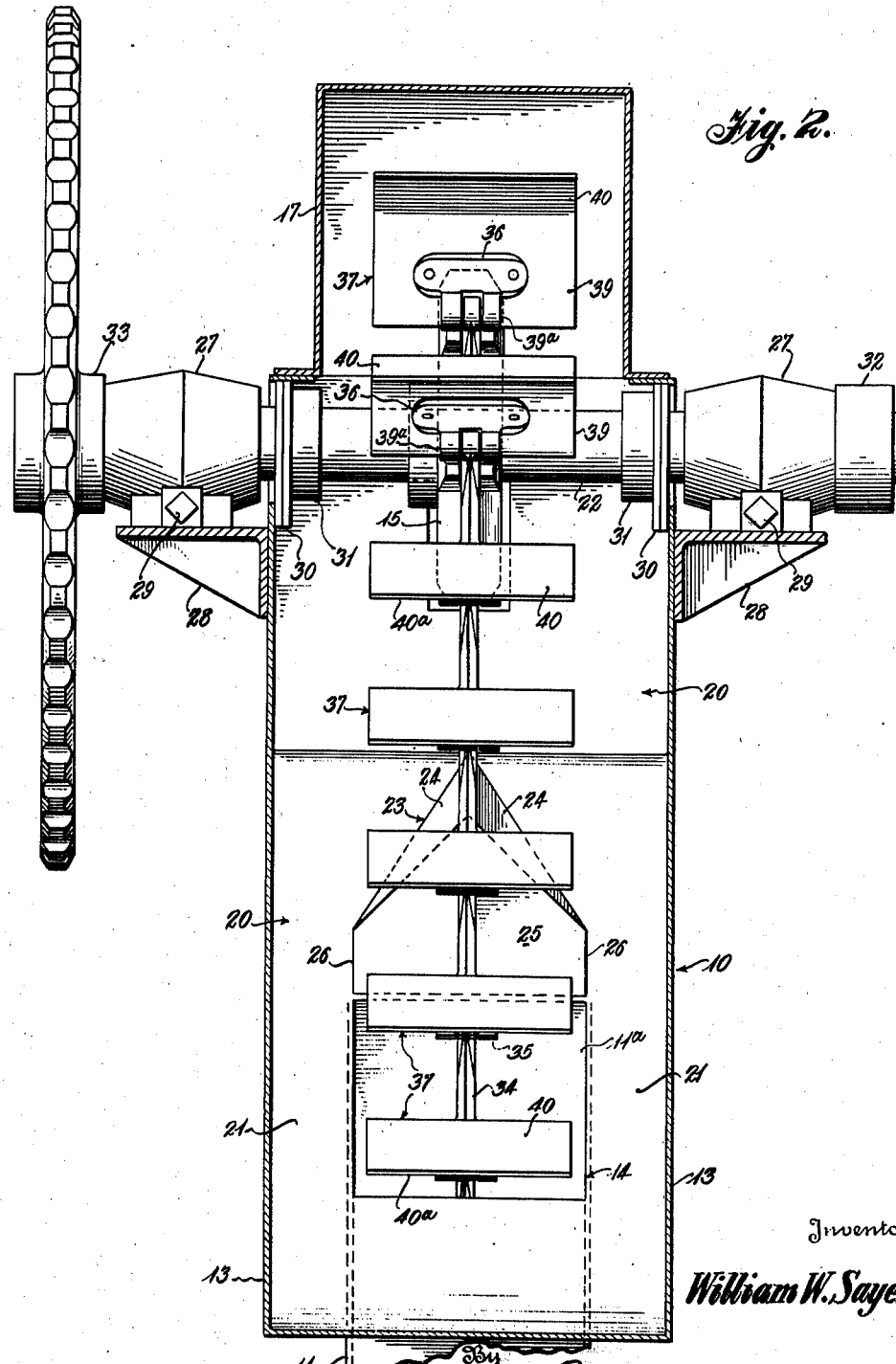

Other objects and advantages of the invention will be apparent during the course of the following description:

In the accompanying drawings forming a part of this specification and in which like numerals are employed to designate like parts throughout the same, Figure 1 is a fragmentary, vertical, sectional view of the upper or head portion of an elevator or a conveyer-elevator type of material transporting device embodying this invention, Figure 2 is a front view of the mechanism disclosed in Fig. 1 and illustrates the casing portion in vertical section and the remaining mechanism in front elevation.

Figure 7:
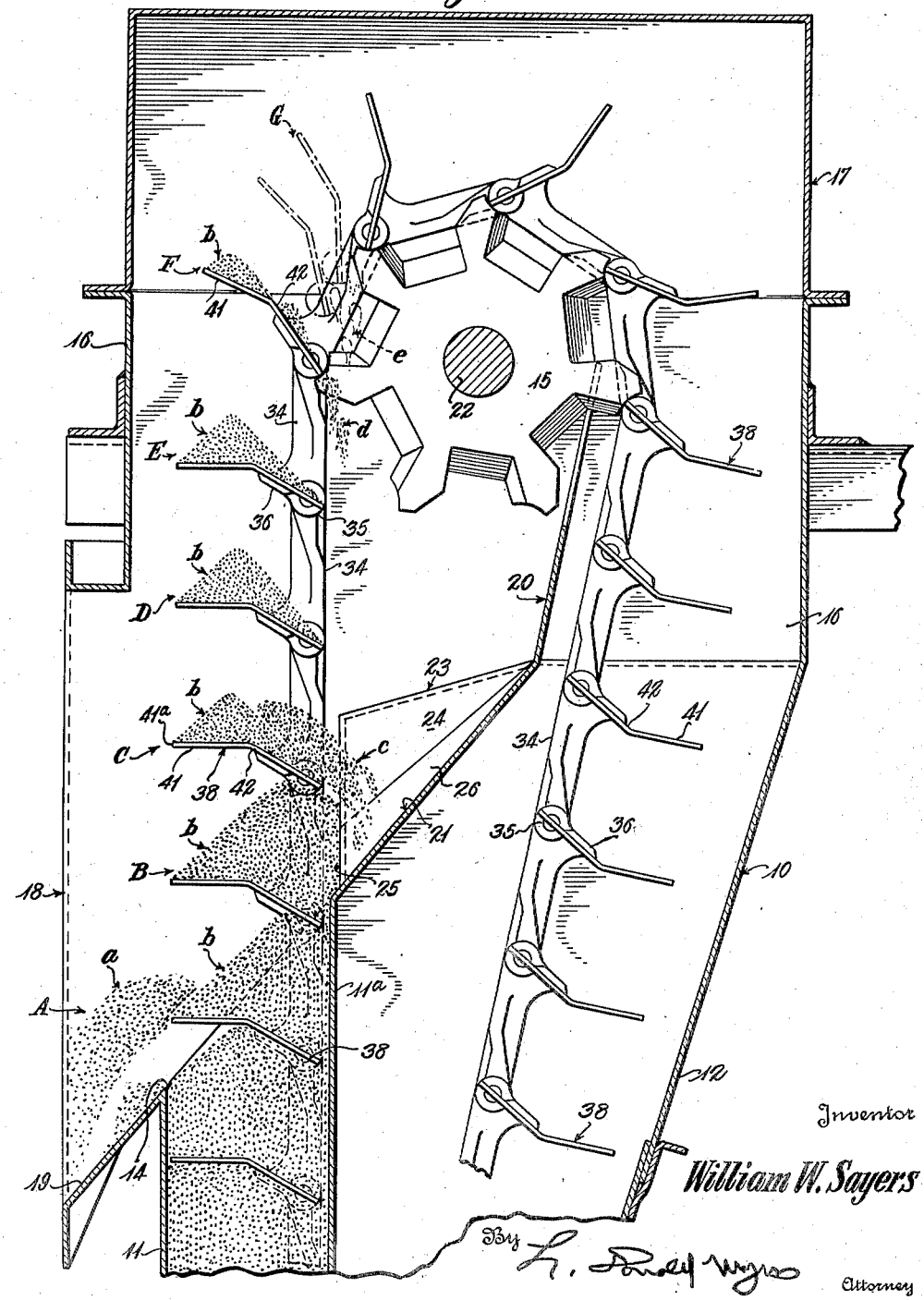

Figure 3 is a vertical, sectional view of a loop-boot elevator embodying this invention, Figure 4 is a vertical, sectional view of an L-type of conveyer-elevator embodying this invention, Figure 5 is a vertical, sectional view of a horizontal or feed conveyer in which the material is transported by the lower run to the discharge chute, Figure 6 is a similar view to Fig. 5 but illustrates the material being transported by the upper run, and Figure 7 is a view similar to Fig. 1 but illustrates a modified form of peak-top flight which may be used throughout the entire length of the conveyer chain but is preferably used as a cleanout flight for the type of mechanism disclosed in Figs. 1 to 4, inclusive.

In the drawings, wherein for the purpose of illustration are shown the preferred embodiments of this invention, and particularly referring to Figs. 1 and 2, the reference character 10 designates in its entirety the upper or head portion of an elevator or a conveyer-elevator casing. This casing portion, for example, may be the upper or head portion of the mechanisms disclosed in Figs. 3 and 4. The casing includes the vertical leg portion 11 which encloses the active run of the conveyer mechanism. The vertical leg for the return run of the conveyer is designated by the reference character 12. Above these two vertical legs 11 and 12 the head section of the casing is enlarged or increased in its horizontal dimensions, as is clearly illustrated in Figs. 1 and 2. Fig. 2 clearly illustrates the enlargement of this head section of the casing laterally in both directions with respect to the active vertical leg 11. These lateral enlargements will be designated by the reference character 13. This enlarging of the head section of the casing is for the purpose of facilitating the discharge of material from the flights as they reach the level of the discharge or outlet opening 14, see Fig. 1. The fore and aft enlargement of the head section of the casing facilitates movement of the chain and its flights over the head sprocket wheel 15 and the return of the conveyer chain and flights to the inactive vertical leg 12. This fore and after enlargement of the head casing section will be generally designated by the reference character 16. A cover or cap 17 closes the top of the casing and is readily removable for affording easy inspection and adjustment of the conveyer mechanism. A discharge chute 18 projects from the front of the casing and corresponds in width with the laterally enlarged portion 13 of the casing head section. The height of this discharge chute 18 may be varied as desired but should be ample to allow for the free passage of the conveyed materials therethrough. The provision of this discharge chute 18 also functions to increase the fore and aft dimensions of the casing head section to facilitate rapid discharge of the material as it reaches the level of the discharge opening 14 of the vertical, active leg 11.

Arranged as a continuation of the bottom wall 19 of the discharge chute 18 is the gathering chute 20 which has its side portions 21 arranged on opposite sides of the discharge or outlet opening 14 which form the floor for the casing enlargement portion 13. Fig. 1 clearly discloses this gathering chute 20 as extending transversely beneath the head sprocket wheel 15 and upwardly on opposite sides of the same to approximately the horizontal center line of the shaft 22 on which the head wheel is mounted. The function of this gathering chute will be fully explained at a later point. A flow splitting wedge 23 is mounted on the gathering chute 20 above the upper edge of the discharge or outlet opening 14 of the vertical leg 11 and functions to deflect material in opposite directions around the discharge opening 14 and onto the portions 21 of the gathering chute which lie on opposite sides of the discharge opening 14. This material acted upon by the flow splitting wedge 23 is discharged from the conveyer flights after they leave the level of the discharge opening 14 and while they are traveling up to and partly around the head sprocket wheel 15. This discharge of material will be described in detail at a later point. These Figs. 1 and 2 clearly illustrate this flow splitting wedge as including the diverging top surfaces 24 which terminate at their front edge in a truly perpendicular wall portion 25 which registers or is aligned with the rear wall 11a of the active vertical leg 11 of the conveyer casing. The side edges of these diverging top walls 24 are joined with perpendicular side walls 26. Fig. 2 clearly discloses the peak or crown of this flow splitting wedge 23 as lying in the vertical central plane of the head sprocket wheel 15.

The shaft 22 is journaled in bearings 27 which are adjustably mounted on bearing brackets 28 attached to the opposite side walls of the casing. Adjusting screws 29 are employed for positioning the bearings 27 on the brackets 28. Sealing plates 30 are positioned on the shaft 22 for closing the openings in the casing through which the shaft extends to its bearings 27. Suitable collars 31 may be employed for retaining the sealing plates 30 in place. A safety collar 32 is mounted on one end of the shaft 22 while a driving sprocket 33 is mounted on the opposite end. This collar 32 and sprocket 33 will function to prevent undesired axial movement of the shaft.

The mechanism which actually transports or moves the material through the active portion or portions of the casing includes a flexible driving member which is specifically illustrated as being formed by a suitable number of bar links which are interconnected by articulated joints to form an endless chain. It is to be understood, however, that the flights constitute the important novel portion of the transporting mechanism, and for that reason the flights may be suitably connected to a flexible cable, or other drive member, if so desired. The articulated joints 35 between adjacent links are formed by apertured pivot ears provided on the opposite ends of the links. For example, each link may have a single, centrally positioned ear formed on its leading end and a pair of transversely spaced, symmetrically arranged pivot ears formed on its trailing end. The spaced ears, of course, will receive the single ear of the next adjacent link. Chain pins 5 may be employed for pivotally joining the interfitted pivot ears of adjacent links. If this chain link structure is employed, the trailing end of each ilnk, the end having the spaced pivot ears, is provided with suitable attachment lugs 36 to which the peak-top, solid flights are secured by bolts or rivets. Of course, other securing means may be employed if desired. It will be seen, therefore, that each flight is rigidly attached to the trailing end of its respective link and the flights will partake of the movements of the trailing ends of their ilnks. The flights, also, are spaced from each other uniformly throughout the length of the drive member. It has been determined that the flight spacing preferably should be approximately equal to the width of the casing; for example, the dimensions of the vertical leg 11. The spacing of the flights reasonably close together prevents too high a column of material being provided over any flight when lively material is being carried which would tend to pack and create excessive side pressure on the casing walls.

Fig. 1 discloses flights 37 as being attached to a major portion of the links. Flights 38 are substituted for the flights 37 at any desired predetermined intervals. Flights 37 are of the preferred and most efficient shape. It has been determined, however, that for certain materials the flights 37 will not be as efficient for cleaning out or emptying the conveyer casing. Flights 38. therefore, are provided when necessary to effect complete emptying of the casing.

Specifically referring to the flights 37, Fig. 2 discloses these flights as being solid, or without any perforations, openings, or the like. The term "solid" is employed throughout the specification and claims to define the character of flights embodying this invention and to distinguish from conventional open or skeleton flights. It is to be understood, however, that this term does not exclude flights which are provided with relatively small apertures, slots, or the like, if such flights possess the material conveying characteristics of the flights which are actually disclosed herein. Each flight consists of an inner portion or section 39 and an outer portion or section 40. These portions or sections are angularly arranged with respect to each other and with respect to the plane of movement of the chain or flexible drive means. This angular relationship provides a peak or top ridge 41 at the line of junction between the two portions. This line of junction or peak is parallel with the front and rear edges of the flight portions 40 and 39, respectively. These front and rear edges and the peak or junction line, also, are parallel with the front and rear walls of the casing leg, such as the leg 11, and are parallel with the lower or front edge of the discharge opening 14, see Fig. 2.

It will be appreciated that the portions 39 and 40 of the flights 37 may be arranged at any desired angle or angles with respect to the horizontal, or a plane normal to the plane of travel of the chain. These angles will vary to a certain extent with conveyers, or the like, which are specifically designed for handling certain materials; depending upon the angle of repose of said materials. Considering that the vast majority of materials which will be handled by conveyers, or the like, of this character have an angle of repose which will not exceed 45°, the front flight portion 40 preferably is arranged at an angle of 45° with respect to the horizontal. The rear flight portion 39, although it also may be arranged at any desired angle, preferably is arranged at an angle of 30°. The relative fore and aft dimensions or depths of the flight portions 39 and 40, with reference to their respective angles, should be such that the front or forward edge 40a of each flight 37 preferably is arranged at or slightly rearwardly of the pitch center of the joint with which the flight is associated. The rear edge portion of the flight part 39 is notched or cut away at 39a, see the upper two flights in Fig. 2, to straddle the joint ears of the chain links so that the rear edge of this flight portion 39 closely approaches the inner faces of the respective chain links, i. e., the supporting faces of the links which engage the inner casing wall.

The clearance between the flights 37 and the normal conveyer casing portions, such as the vertical leg 11, should be equal to or slightly greater than the average size of the lump material being transported, unless the fines in a mixture represent a major portion of the mixture; i. e., 80% to 90%, more or less, when the flight clearance should be provided to suit the fines.

The bottom wall 19 of the discharge chute 18 and the portions of the gathering chute 20 which lie in the same plane as this bottom wall 19 preferably, although not necessarily, should be arranged or positioned at an angle of approximately 50°. Very few materials to be handled by this type of conveyer, or elevator, have an angle of repose in excess of 50°. Of course, the bottom wall 19 of the chute 18 and the aligned portions of the gathering chute 20 may be arranged at a greater or lesser angle than 50° as required for handling different kinds of materials.

Fig. 1 clearly illustrates the manner in which materials having an angle of repose of 45° will be discharged from the flights 37 as they move up to the level of the discharge opening 14 and above this level into operative relation with the head sprocket wheel 15. This figure discloses a flight 37 in what will be termed position A. This flight has reached and has moved slightly beyond the level of the bottom, forward edge of the discharge opening 14. With a flight in this position all material occupying the space between this flight and the next preceding flight 37 which lies forwardly of a projection of the flight portion 40 will be discharged from the space between the two flights and will pass out of the casing through the discharge chute 19. This portion of the material will be designated by the reference character a. All of the material lying inwardly of this vertical projection of the outer flight portion 40, the material designated by the reference character b, will remain resting on the flight portion 39. Of course, if the material being conveyed has an angle of repose which is less than 45°, a greater portion of the material will be discharged as material a and a lesser portion will remain as material b. This material b is pocketed between the rear wall 11a of the vertical leg 11 and the side walls of this leg up to the level of the gathering chute portions 21.

As the flights 37 move up into the position B, the side support for the material b is removed; i. e., the material is moved up above the side portions 21 of the gathering chute. Material then will flow laterally off of the flight portion 39 of this position B onto the side portions 21 of the gathering chute. The retained material b in this flight position B, therefore, will be shaped to have front and side surfaces occupying angles of approximately 45°. The rear face or surface of this material b in flight position B is still supported by the perpendicular face 25 of the flow splitting wedge 23.

As the flights move up into position C, the width of the front perpendicular face 25 of the flow splitting wedge 23 is gradually reduced, due to the divergent arrangement of the sloping surfaces 24 of the wedge, and material c flows backwardly or rearwardly off of the flight portion 39. This rearward movement or discharge of the material c resting on the flight portion 39 continues until the flight 37 passes beyond the peak or ridge line of the flow splitting wedge 23. Flight positions D and E represent the movement of the flights between the ridge line of the wedge 23 and the point of mesh between the teeth of the head sprocket wheel 15 and the chain. In these positions D and E, the material b remaining on the flight portions 39 has been trimmed off both laterally and rearwardly so that all faces of the material lie approximately in planes of 45° angles. Of course, if the material being handled has an angle of repose which is less than 45°, the amount of material b resting on the flight portions 39 in positions D and E will be less. If the angle of repose of the material does not exceed 30°, the angle of the flight portions 39, all of the material will be discharged from the flight portions 39 after they have moved above the flow splitting wedge 23 with the possible exception of a small amount of material which may be retained on the flight portions 39 by the chain. The cross-sectional shape of the chain bar bodies may be such as to minimize this amount of trapped material.

The flight 37 illustrated in position F has its pitch center lying in the horizontal center line, i. e., the horizontal plane which passes through the axis of the shaft 22, and the chain joint to which this flight 37 is attached has meshed with a tooth of the head sprocket wheel 15. This meshing of the chain joint carrying the flight 37 of position F has caused the flight portion 39 to change its angle. In this specific structural arrangement, the angle of the flight portion 39 is now 55°. The material b which remained on the flight portions 39 in positions D and E is discharged when the flights occupy position F and this discharged material will be identified by the reference character d.

When the flights 37 reach the position G, the flight portion 39 is arranged truly perpendicularly. Assuming that a very small amount of material still remained on the flight portion 39 when the flight reaches position D, this material would be completely discharged at position F unless, of course, the material is so sticky as to remain attached to the flight portion 39 even though it is arranged at an angle of 90° with respect to the horizontal. It has been determined that any ordinary material will not pass beyond the flight position F.

Assuming that small particles f of material have remained on the flight portions 40, this material f will be given a second opportunity to be discharged when or shortly after the flights reach position H.

It will be appreciated that all of the material which has left the flight portions 39, by being discharged rearwardly of the flights, will fall onto the gathering chute 20 and will be directed downwardly by this chute into the discharge chute 19 and then outwardly of the casing. The flow splitting wedge 23 will function to prevent any of this material discharged rearwardly of the flights from impinging against the material resting upon the flight portions 39. This rearwardly discharged material will all pass around the discharge opening 14 for the vertical leg 11.

It would be confusing to attempt to illustrate in Fig. 1 the manner in which the special cleanout flights 38 function to discharge material after they have passed the discharge opening 14 of the vertical leg 11. The discharge of material from these special flights 38, of course, will be different than the discharge of material from the flights 37 due to the fact that the outer portion of each flight 38, designated by the reference character 41, is approximately horizontally arranged or occupies a plane which is normal to the plane of travel of the driving means. The inner or rear portion 42 of each clean-out flight 38 is arranged at the same angle as the rear portion 39 of each main conveyer or peak-top flight 37, i. e., 30°. These flights 38 are attached to the chain links 34 in the same manner as the peak-top flights 37.

It will be appreciated that the material transporting mechanism could be provided with nothing but flights 38 if desired. Therefore, for the purpose of disclosing this type of chain conveyer and for the purpose of illustrating the manner in which the clean-out flights 38 of Fig. 1 discharge the material carried thereby, Fig. 7 has been provided. The disclosure of this figure differs from the disclosure of Fig. 1 only with reference to the specific construction of the flights and the manner in which they discharge the transported material. Therefore, the same reference characters will be applied to like structural elements in Fig. 7.

The flights 38 of this transporting mechanism of Fig. 7 are the same as the flights 38 of Fig. 1. The forward portion 41 of each flight is, preferably, approximately horizontally arranged. The rear portion 42 of each flight may be arranged at any desired angle, but it is preferred to position this portion at a 30° angle with respect to the horizontal.

As the flights 38 move into a position where the front edge 41a reaches the level of the bottom edge of the discharge opening 14 for the vertical leg 11, material a will be discharged therefrom into the chute 19. This material is illustrated as having left the flight 38 illustrated in position A. The material b remains on the flight and is supported by the rear flight portion 42 and the front flight portion 41. The cleavage line between the discharged material a and the retained material b will depend upon the angle of repose of the particular material being handled. In Fig. 7, the illustrated material is assumed to have an angle of repose of 45°. The material carried by the flight 38 in position A is still supported by the side walls of the vertical leg 11 and is further supported by the rear wall 11a of this leg. As the flights 38 move from the position A into the position B, the lateral support afforded by the side walls of the vertical leg 11 is withdrawn. Material will be discharged laterally in opposite directions from the flights in position B onto the portions 21 of the gathering chute 20. In position B, the rear or inner side of the material b is still supported or retained in place by the perpendicular face 25 of the flow splitting wedge 23. As the flights 38 move into the position C and above this position, the rear support for the material is withdrawn as the converging top surfaces 24 of the wedge 23 recede. Material c, therefore, will be discharged rearwardly from above the supporting flight portion 42. The material which still remains on the flights in positions D and E has all of its top surfaces arranged on 45° angles with respect to the horizontal. In other words, the piles of material b in positions D and E will each have the shape of a pyramid. Of course, if the angle of repose of the material is only 30° or less, no material will remain upon the rear inclined flight portions 42. The only material which will remain on the flights will be supported by the portion 41.

As the chain joints mesh with the teeth of the head sprocket wheel 15, the flights are tilted from their normal positions. In position F, the rear flight portion 42 assumes an angle of 55°. The outer or front flight portion 41 is caused to assume an angle of 26° with respect to the horizontal. This change of angles results in the discharge of material b from the flight portions 42 and, of course, some of the material b is discharged from above the flight portion 41. As the flight portion 41 in position F has assumed an angle of 26°, any material which has an angle of repose of less than 26° will be completely discharged from this portion 41. The material b remaining on the portion 41 in position F can be assumed to have an angle of repose which is greater than 26°.

As the chain joints move around the pitch circle of the head sprocket wheel 15, the angles of the flight portions 41 and 42 will continue to change rapidly. When the flights reach the position G, the inner flight portions 42 will assume a truly perpendicular position. The outer flight portions 41 will have assumed an angle of 60°. Any material remaining on these two flight portions, therefore, will be discharged as material e.

The material designated by the characters c, d, and e, discharged rearwardly from the various flights, will, of course, drop onto the gathering chute 20 and be conducted thereby to the discharge chute 19. The flow splitting wedge 23 will divide and spread the material laterally so that it will pass around the discharge opening 14 of the vertical leg 11 and will travel down the portions 21 of the gathering chute to the discharge chute 19. Although material will not be discharged from the flights 38 as rapidly as from the peak-top flights 37, it will be appreciated that the material should be completely discharged from the flights 38 prior to movement of the chain joints into a top dead center position with respect to the axis of the shaft 22. As a matter of fact, the chain joints have moved 35° beyond the horizontal plane which passes through the axis of the shaft 22 and the pitch axis of the flight arranged in position F by the time the flights assume the position G where the final material is discharged from the flights.

Figs. 3 to 6, inclusive, illustrate the use of the transporting mechanism of Fig. 1 in different types of conveyer devices.

Fig. 3 discloses a loop-boot elevator arrangement which includes the active vertical leg 11, the inactive return leg 12, and a bottom loop-boot casing portion 46. A feed hopper 47 is associated with the bottom portion of the loop-boot 46 so as to feed the material by gravity into the spaces between the flights 37. Also, it has been determined that these peak-top flights 37, due to the oppositely inclined arrangement of their portions 39 and 40, will not exert side pressures against the walls of the active vertical leg 11 which will cause the chain, or other driving means, to be forced or wedged against the back wall of the conveyer casing or the front edges 41a of the flights to be forced or wedged against the front wall of the casing leg 11. In other words, the angular shape of the peak-top flights balances the fore and aft pressures against the walls of the casing to prevent the chain and the flight edges from dragging over the inner surfaces of the casing walls.

Fig. 4 discloses the use of the peak-top flights 37 in an L type conveyer-elevator. In this type of mechanism, the active run includes a horizontal portion 48 and a vertical leg portion 11 discharging through the chute 19. The return run includes a vertical leg portion 12 and a horizontal portion 49. A feed hopper 50 delivers the material to a portion of the horizontal part 49 of the return run. This return run is separated from the horizontal active run portion by a partition 51 which terminates short of the foot wheel or sprocket 52 so that the material will discharge from the flights in the return run beyond the end of the partition 51 and will be deposited between the flights in the horizontal portion 48 of the active run of the casing.

Fig. 5 discloses a horizontal or feeder type conveyer. The casing of this conveyer includes an inactive run portion 53 and an active run portion 54. In this type of conveyer, the material is transported through the lower portion 54 of the casing. This portion is provided with a discharge chute 55 while a feed hopper 56 is associated with the foot end of the upper return casing portion 53. A partition 57 underlies the inactive run of the conveyer chain as it passes beneath the feed hopper 56. The material is discharged from the inactive run of the conveyer chain to the active run over the edge of the partition 57.

In Fig. 6 there is disclosed a horizontal or feed conveyer which differs from the disclosure in Fig. 5 only by moving the material through the horizontal upper casing section 57 from the feed hopper 58 to the discharge chute 59. The conveyer chain with its flights 37 returns through the casing portion 60. A partition 61 underlies the chain and its flights while traveling through the load carrying run of the conveyer.

Because of the ability of the peak-top flights to completely discharge materials having an angle of repose not exceeding 45° by the time the joint axes reach the horizontal plane which passes through the head sprocket wheel axis, conveyers employing the peak-top flights 37 may be operated at a higher rate of speed than conveyer chains employing ordinary solid flat flights and a much smaller percentage of material will be carried over the top of the head wheel into the return run 12 of the casing. The capacity of a conveyer employing the peak-top flights 37, therefore, is considerably greater than the capacity of a conveyer employing flat solid flights.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a conveyer, or the like, for transporting solid materials, a chain conveyer comprising a plurality of articulated links and a solid flight attached to each link so as to project from only one side thereof, each of said solid flights comprising a plurality of portions which are angularly arranged with respect to each other so as to provide exterior material moving surfaces and with the portion adjacent the chain being inclined to the path of travel of the chain.

2. In a conveyer, or the like, for transporting solid materials, a chain conveyer comprising a plurality of articulated links and a solid flight attached to each link, each of said solid flights comprising a plurality of portions which are angularly arranged with respect to each other and with at least two portions being inclined rearwardly to the direction of travel of the chain.

3. In a conveyer, or the like, for transporting solid materials, a chain conveyer comprising a plurality of articulated links and a plurality of solid flights attached thereto and projecting from one side thereof, each of said solid flights comprising a plurality of portions which are angularly arranged with respect to each other, so as to provide exterior material moving surfaces, the flight portion arranged closest to the chain being inclined so as to discharge material around the chain.

4. In a conveyer, or the like, for transporting solid materials, a flexible drive member, and a plurality of solid flights attached thereto, each of said solid flights comprising two flat portions which are angularly arranged with respect to each other so as to form a peak or ridge line at their juncture which is located on the advance side of the flight.

5. In a conveyer, or the like, for transporting solid materials, a conveyer comprising a plurality of articulated links and a solid flight attached to each link at one of its joint ends, each of said solid flights comprising two portions which are angularly arranged with respect to each other so as to provide exterior material moving surfaces and with respect to the plane of travel of the chain so as to discharge material in opposite directions relative to said plane.

6. In a conveyer, or the like, for transporting solid materials, a conveyer comprising a plurality of articulated links and a plurality of solid flights rigidly attached thereto, each of said solid flights comprising a plurality of portions which are angularly arranged with respect to each other, certain of said flights having the portion located farthest from the chain arranged in a plane which is approximately normal to the plane of travel of the chain.

7. In a conveyer, or the like, for transporting solid materials, a flexible drive member, and a plurality of solid flights rigidly attached thereto and projecting laterally therefrom in only one direction, each of said solid flights comprising two material moving portions which are angularly arranged with respect to each other so as to form a peak or ridge line at their juncture which is offset laterally with respect to the plane of travel of the driving member.

8. In a conveyer, or the like, for transporting solid materials through an enclosing casing disposed in a desired closed path including a vertically arranged leg and having a discharge opening formed in a wall thereof, the improvement which comprises an endless conveyer for operating in said casing, said conveyer comprising a flexible drive member and a plurality of solid flights rigidly attached to said drive member, each of said flights comprising a plurality of portions which are angularly arranged with respect to each other and with respect to the plane of the drive member while moving past the discharge opening.

9. In a conveyer, or the like, for transporting solid materials through a casing disposed in a desired closed path and including a vertically arranged leg portion and a head section above the leg portion having a discharge opening formed in a vertical wall thereof and an inclined gathering chute located therein and extending to said discharge opening, and an endless conveyer operating in said casing comprising a flexible drive member and a plurality of solid flights rigidly attached to said drive member, the improvement which consists of each of said flights having a plurality of portions which are angularly arranged with respect to each other, the angular arrangement of one of said flight portions being such as to cause all of the material resting thereon to be discharged onto the gathering chute toward the discharge opening by the time the flight moves out of the said vertical leg portion into the head section, and the angular arrangement of another of said flight portions being such as to cause material resting thereon to be discharged rearwardly onto the gathering chute away from said discharge opening after the flight leaves the vertical leg and is approaching the head wheel.

10. In a conveyer, or the like, for transporting solid materials through an enclosing casing disposed in a desired closed path and having a discharge opening formed in a vertical wall thereof, and an endless conveyer operating in said casing comprising a flexible drive member and a plurality of solid flights rigidly attached to said drive member, the improvement which consists of each of said flights having flat portions arranged at an angle with respect to each other so as to form a peak line extending transversely of the flight and parallel to the bottom edge of said discharge opening.

11. A conveyer, or the like, for transporting solid materials, comprising an enclosing casing disposed in a desired closed path and having a discharge opening formed in a vertical wall thereof, and an endless conveyer operating in said casing, said conveyer comprising a flexible drive member and a plurality of solid flights rigidly attached to said drive member, each of said flights comprising a plurality of portions which are angularly arranged with respect to each other and with respect to the plane of the drive member while moving past the discharge opening, certain of the flights having their respective angularly arranged portions inclined forwardly and rearwardly relative to the discharge opening.

12. In a conveyer, or the like, for transporting solid materials, an enclosing casing disposed in a desired closed path and having a discharge opening formed in a vertical wall thereof, and an endless conveyer operating in said casing, said conveyer comprising a flexible drive member and a plurality of solid flights rigidly attached to said drive member, each of said flights comprising a plurality of portions which are angularly arranged with respect to each other and with respect to the plane of the drive member, certain of the flights having one of their angularly arranged portions sloping backwardly relative to the location of the discharge opening, and another of said portions arranged so as to lie in a plane which is normal to the plane of travel of the flexible drive member.

13. In a conveyer, or the like, for transporting solid materials, an enclosing casing disposed in a desired closed path and having a discharge opening formed in a vertical wall thereof, and an endless conveyer operating in said casing, said conveyer comprising a flexible drive member and a plurality of solid flights rigidly attached to said drive member, each of said flights comprising a plurality of portions which are angularly arranged with respect to each other and with respect to the plane of the drive member, certain of the flights having their respective angularly arranged portions inclined forwardly and rearwardly relative to the location of the discharge opening, the remaining flights having one of their angularly arranged portions sloping backwardly relative to the location of the discharge opening and having another of said portions lying in a plane which is normal to the plane of the flexible drive member.

14. In a conveyer, or the like, for transporting solid materials through a casing disposed in a desired closed path and including a vertically arranged leg portion and a head section above the leg portion having a discharge opening formed in a vertical wall thereof, and an endless conveyer operating in said casing comprising a flexible drive member and a plurality of solid flights rigidly attached to said drive member, the improvement which consists of each of said flights having a plurality of portions which are angularly arranged with respect to each other, the portion of each flight located closest to the casing wall having said discharge opening being inclined so as to discharge material resting thereon which has an angle of repose not exceeding 45° upon leaving the vertical leg portion.

15. In a conveyer, or the like, for transporting solid materials, an endless conveyer comprising a flexible drive member and a plurality of solid flights rigidly attached to said drive member, each of said flights being divided into two material moving portions which slope backwardly in opposite directions with respect to the direction of travel of the conveyer so as to form a dividing peak or ridge line which forms the leading part of the flight.

16. A conveyer, or the like, for transporting solid materials, comprising an enclosing casing disposed in a desired closed path and including a head section having an inclined gathering chute, provided with a conveyer passing opening, traversing the head section, and an endless conveyer operating in said casing and passing through the opening of the chute, said conveyer comprising a flexible drive member and a plurality of solid flights rigidly attached to said drive member, each of said flights comprising a pair of inclined material moving portions which are angularly arranged with respect to each other, the angle of inclination of one of said flight portions substantially coinciding with the angle of inclination of the gathering chute so that material supported by said portion will be discharged when the flight reaches the level of the chute.

17. In a conveyer, or the like, for transporting solid materials, an enclosing casing disposed in a desired closed path, said casing including a head section having an inclined gathering chute traversing the same, and a vertical leg communicating with the head section through an opening formed in said gathering chute, a head wheel located in the head section of the casing above said gathering chute, and an endless conveyer operating in said casing and trained over the head wheel, said conveyer comprising a flexible drive member and a plurality of solid flights rigidly attached to said drive member, each of said flights comprising a pair of inclined material moving portions which are angularly arranged with respect to each other, the angle of inclination of one of said flight portions substantially coinciding with the angle of inclination of the gathering chute so that material supported by said portion will be discharged when the flight reaches the level of the chute, the remaining flight portion, when its angle of inclination is less than the angle of repose of the handled material, being caused to assume an angle which will effect discharge of the material resting thereon as it starts its travel around the head wheel.

18. In a conveyer, or the like, for transporting solid materials through a casing disposed in a desired closed path and including a vertically arranged leg portion and a head section above the leg portion having a discharge opening formed in a vertical wall thereof, an endless conveyer operating in said casing and comprising a flexible drive member and a plurality of solid flights rigidly attached to said drive member, the improvement which consists of each of said flight members having two portions which are angularly arranged with respect to each other, and to the direction of travel of the drive member so as to normally spill the material reposing thereon in two different directions, and means cooperating with the solid flights as they leave the vertical leg portion and move through the head section to cause the material to be spilled in four different directions in three successive stages.

19. In a conveyer, or the like, for transporting solid materials through a casing disposed in a desired closed path and including a vertically arranged leg portion and a head section above the leg portion having a discharge opening formed in a vertical wall thereof, an endless conveyer operating in said casing and comprising a flexible drive member and a plurality of solid flights rigidly attached to said drive member, the improvement which consists of each of said flight members having two portions which are angularly arranged with respect to each other and which form two different angles with respect to the angle of repose of the material supported thereon, and means cooperating with the solid flights as they leave the vertical leg portion and move through the head section to cause the material reposing on said flight portions to be released in successive stages with the flight portion having the greatest angle entirely discharging its material before any material reposing on the second portion is discharged.

20. In a conveyer, or the like, for transporting solid materials, a head wheel having radial chain engaging teeth, and an endless conveyer trained over the head wheel and traveling in a vertical path in approaching the latter, said conveyer comprising a chain formed of a plurality of pivotally connected links with the pivotal connections of the links meshing with the teeth of the wheel, and a plurality of solid flights rigidly attached to the chain at the pivotal connections, each of said flights including two portions which are angularly arranged with respect to each other and with respect to the horizontal when traveling through said vertical path, said angular arrangements being such as to cause the angle of one flight portion to be increased and the angle of the other flight portion to be decreased as the chain links mesh with and move partly around the head wheel.

WILLIAM W. SAYERS.